US006740256B1

United States Patent
Wu et al.

(10) Patent No.: US 6,740,256 B1
(45) Date of Patent: May 25, 2004

(54) CHIRAL SWALLOW-TAILED LIQUID CRYSTAL AND ITS FABRICATION METHOD

(75) Inventors: Shune-Long Wu, Taipei (TW); Wen-Jiunn Hsieh, Chung-Ho (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 0 days.

(21) Appl. No.: 10/404,560

(22) Filed: Apr. 2, 2003

(51) Int. Cl.$^7$ .................. C09K 19/32; C09K 19/34; C07C 69/76
(52) U.S. Cl. .............. 252/299.62; 252/299.61; 560/56; 560/64; 560/74; 560/88; 560/100
(58) Field of Search ............ 252/299.61, 299.62; 560/56, 64, 74, 88, 100

(56) References Cited

FOREIGN PATENT DOCUMENTS

JP        03-48649    *    3/1991

OTHER PUBLICATIONS

English abstract for JP 03–48649.*

* cited by examiner

Primary Examiner—Shean C Wu
(74) Attorney, Agent, or Firm—Rosenberg, Klein & Lee

(57) ABSTRACT

A chiral swallow-tailed liquid crystal is provided. The present chiral swallow-tailed liquid crystal is synthesized from a chiral material. The present chiral swallow-tailed liquid crystal is composed of the compound of (N,N'-diethyl (s)-2-{6-[4-(4'-alkoxyphenyl)benzoyloxy]-2-naphthyl}propanamide or the compound of (N,N'-dipropyl (s)-2-{6-[4-(4'-alkoxyphenyl)benzoyloxy]-2-naphthyl}propanamide. The chiral center of the present chiral compound is directly linked to its rigid core, and the chiral tail of this compound is linked with a swallow-tailed group. The chiral center and swallow-tailed group are arranged at the same side in the molecular structure. This structural characteristic enables the chiral compound to have the same property of thresholdless antiferroelectricity, and the advantage of simple manufacturing process. The present chiral compound shows an optimum application effect in liquid crystal displays.

19 Claims, 8 Drawing Sheets

Series I : DEmPBNPA( m = 10~15, n = 2)
Series II : DPmPBNPA( m = 6~16, n =3)

CHIRAL SWALLOW-TAILED LIQUID CRYSTAL AND ITS FABRICATION METHOD

BACKGROUND OF THE INVENTION

1. Field of the Invention

The present invention relates to an antiferroelectric liquid crystal material and its fabrication, more particularly to a chiral swallow-tailed liquid crystal material and its fabrication.

2. Description of the Prior Art

Currently, the antiferroelectric phase discovered in chiral liquid crystal has a tristable switching property, i.e., in addition to the bistable property of regular ferroelectric liquid crystal, chiral liquid crystal has an antiferroelectric chiral smectic C phase property, hereinafter called $S_{CA}^*$, or the so-called "third stable state".

Normally, antiferroelectric liquid crystal and ferroelectric liquid crystal have a similar helical structure. The helical structure of antiferroelectric liquid crystal is composed of zigzag bilayers in which, as shown in FIG. 1, the liquid crystal molecules of each two adjacent layers are arranged in reversed directions. In the helical structure of ferroelectricl liquid crystal, the liquid crystal molecules of each two adjacent layers are arranged in a same direction, as shown in FIG. 2.

The helical structure of antiferroelectric liquid crystal can be surface stablized to the state like ferroelectric liquid crystal by means of the unwound effect between liquid crystal molecules and interface. Under this surface stabilized state, due to that the liquid crystal molecules are arranged in a same direction, the ferroelectricl liquid crystal shows a same direction of molecule dipole as shown in FIG. 3. This feature causes the regular ferroelectric liquid crystal to produce pure spontaneous polarization. On the contrary, the liquid crystal molecules of the antiferroelectric liquid crystal show a zigzag bilayer structure under the surface stabilized state, as shown in FIG. 4, and the dipole of the molecules is respectively set off, without causing pure spontaneous polarization. This state of reverse molecular arrangement is the third stable state, which can be switched to the ferroelectric state by means of the application of an electric field. This switching is the so-called "field-induced antiferroelectric to ferroelectric switching". Under the effect of an electric field, the tristable state of antiferroelectric shows particular electric-optical effects, for example, the properties of DC critical electric field and hysteresis. Theses properties can be used to improve design limitations on LCD (liquid crystal display) viewing angle and contrast ratio.

Further, the antiferroelectric liquid crystal provides the following advantages:

(1) The optical axes of the molecules of antiferroelectric liquid crystal molecules are arranged along the alignment, which facilitates to alignment stability;

(2) Under the effect of unwound, the antiferroelectric liquid crystal has the third stable state, that effectively eliminates ghost effect and memory effect;

(3) Under the effect of an electric field, the antiferroelectric liquid crystal has DC critical electrical field and retarding properties, therefore it increases matrix addressing capacity and improves LCD resolution;

(4) The antiferroelectric liquid crystal tends to obtain quasi bookshelf alignment structure, therefore it enables the LCD to have high value of contrast ratio (about 20~30);

(5) The antiferroelectric liquid crystal has a rapid response time, which enables current LCD driving technique to be fully utilized, and therefore it is not necessary to develop a new driving technique; and (6) The antiferroelectric liquid crystal has a self-alignment recovery property; therefore it greatly improves LCD's mechanical resisting and heat impact resisting capability.

As indicated above, the antiferroelectric liquid crystal plays an important role in the manufacturing and application of photoelectric apparatus. Photoelectric apparatus manufacturers and research units pay much attention to the study of the molecular structures of antiferroelectric liquid crystal materials and the relationship between liquid crystals, so as to design a low-cost, high-performance antiferroelectric liquid crystal material for making LCDs.

The molecular structure of currently developed antiferroelectric liquid crystal materials is similar to ferroelectric liquid crystal molecules. Referring to FIG. 5, both are commonly composed of a terminal chiral alkyl chain 1, a rigid core 2, a linking group 3 and an achiral alkyl chain 4. The molecular structure of the terminal chiral alkyl chain, the rigid core and the linking group is the key factor for the formation of antiferroelectric liquid crystals.

The terminal chiral alkyl chain structure in the molecular structure of the antiferroelectric liquid crystal has four different kinds as shown in FIG. 6. The polarity of molecular size of the substituent ($R_1$) of the chiral center $C^*$ is the main factor that affects the formation of antiferroelectric liquid crystals. The structure change of the rigid core has little effect to the formation of antiferroelectric liquid crystals. In materials having different structures of rigid core, as shown in FIG. 7, the change of the rigid core structure from an aromatic ring to an iso-aromatic ring or the one having a substituent does not affect the formation of antiferroelectric liquid crystals. Further, most rigid cores are composed of at least three aromatic rings or iso-aromatic rings. Few antiferroelectric liquid crystal materials have a two-ring structure.

The linking group in an antiferroelectric liquid crystal molecular structure is normally of an ester group or ketone group. As illustrated in FIG. 8, the structure, which is linked between the rigid core and the terminal chiral alkyl chain, is most important. In a recent study on the radiation of X-rays and FTIR (Fourier transform infrared ray) spectrum to ester materials, it is reported that chiral tail linking ester group, which is linked by —COO—, may produce a bent structure, causing the molecules at two adjacent layers to form a reverse pair arrangement of zigzag bilayer structure. This —COO—linking group increases conjugation of the internal electrons of liquid crystal molecules in molecular long axis, that facilitates the formation of antiferroelectric $S_{CA}^*$ liquid crystals.

Because the antiferroelectric liquid crystal has tristable switching property, DC critical electric field property ($E_{th}$) and retarding property, it is an appreciated key material for making high quality LCDs. However, due to the constraint of the influence of high $E_{th}$ value and pretransitional effect, conventional antiferroelectric liquid crystal materials do not provide broad viewing angle and high contrast ratio as expected, when used in the fabrication of LCDs.

Till 1996, Japanese scientist Inui mixed the three antiferroelectric liquid crystal materials (I,II, and III) indicated in FIG. 9 at different ratios, and made a study to see the result of different mixing ratios on $E_{th}$ value and pretransitional effect. This study shows that changing the mixing ratio of these liquid crystal materials effectively reduces antiferroelectric liquid crystal's $E_{th}$ value, however the change of the mixing ratio causes pretransitional effect more significant. According to Inui's report, when the mixing ratio of I:II:III= 40:40:20, no $E_{th}$ value is found, and its field-induced anti-ferroelectric to ferroelectric switching shows a V-shaped switching. Inui gives the name of "Thresholdless antiferroelectric liquid crystals" to this antiferroelectric liquid crystal mixture. These thresholdless antiferroelectric liquid crystals have the following properties:

(1) great tilt angle (>35°);

(2) low driving voltage (<2V/um$^{-1}$);

(3) ideal gray scale;

(4) fast antiferroelectric to ferroelectric switching time (<50 μs);

(5) broad viewing angle (>60°);

The aforesaid properties eliminate the gray scale problem occurred during the fabrication of a passive matrix addressing surface stable ferroelectric liquid crystal display, and also improve the drawback of being difficult to obtain a high contrast ratio commonly existed in regular active matrix or thin film transistor (TFT) addressing type deformed-helix ferroelectric liquid crystal displays and passive matrix addressing type antiferroelectric liquid crystal displays. In the meantime, the aforesaid properties can improve image qualities, particularly for gradational display, such as contrast, while retaining a high-speed responsiveness. It is possible for obtaining a liquid crystal display device, which can display gray scales with high speed and wide viewing angle.

SUMMARY OF THE INVENTION

In view of the numerous advantages of the aforesaid thresholdless antiferroelectric liquid crystals, it is one objective of the present invention to provide a chiral swallow-tailed liquid crystal, which is composed of the compound of (N,N'-diethyl (s)-2-{6-[4-(4'-alkoxyphenyl)benzoyloxy]-2-naphthyl}propionamide or the compound of (N,N'-dipropyl (s)-2-{6-[4-(4'-alkoxyphenyl)benzoyloxy]-2-naphthyl}propionamide; the chiral center of the present chiral compound is directly linked to its rigid core, and the chiral tail of this compound is linked with a swallow-tailed group. The chiral center and swallow-tailed group are arranged at the same side in the molecular structure. This structural characteristic enables the chiral compound to have the same property of thresholdless antiferroelectricity, and the advantage of simple manufacturing process. The present chiral compound shows an optimum application effect in liquid crystal displays.

It is another objective of the present invention to provide a chiral swallow-tailed liquid crystal, which has optical-electrical properties such as antiferroelectricity and thresholdless V-shaped switching, advantageously optimizing the mixing ratio of the liquid crystals for the manufacture of V-shaped thin film transistor liquid crystal displays.

It is a further objective of the present invention to provide a chiral swallow-tailed liquid crystal, which can be used as the liquid crystal material for active matrix addressing type liquid crystal displays.

In order to achieve the above objectives, the present invention provides a chiral swallow-tailed liquid crystal, which is synthesized from a chiral material. The present chiral swallow-tailed liquid crystal is composed of the compound of (N,N'-diethyl (s)-2-{6-[4-(4'-alkoxyphenyl) benzoyloxy]-2-naphthyl}propionamide or the compound of (N,N'-dipropyl(s)-2-{6-[4-(4'-alkoxyphenyl) benzoyloxy]-2-naphthyl}propionamide. The chiral center of the present chiral compound is directly linked to its rigid core, and the chiral tail of this compound is linked with a swallow-tailed group. The chiral center and swallow-tailed group are arranged at the same side in the molecular structure. This structural characteristic enables the chiral compound to have the same property of thresholdless antiferroelectricity, and the advantage of simple manufacturing process. The present chiral compound shows an optimum application effect in liquid crystal displays.

BRIEF DESCRIPTION OF THE DRAWINGS

The foregoing and other advantages and features of the invention will be apparent from the following more particular description of preferred embodiments of the invention with reference to the accompanying drawings.

DESCRIPTION OF THE PREFERRED EMBODIMENTS

Figure 1:
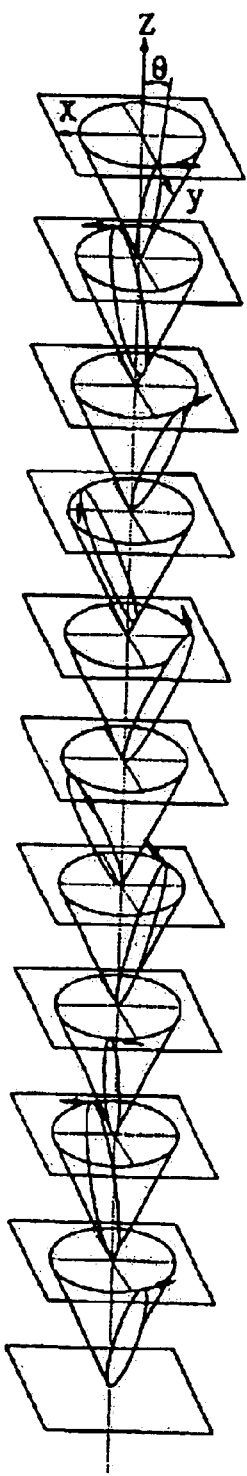
FIG. 1 is a schematic drawing showing the structure of a helical antiferroelectric liquid crystal.
Figure 2:
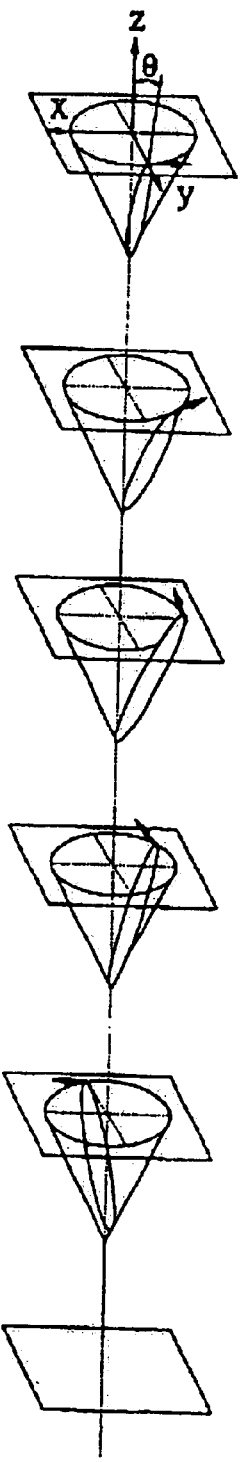
FIG. 2 is a schematic drawing showing the structure of a helical ferroelectric liquid crystal.
Figure 3:
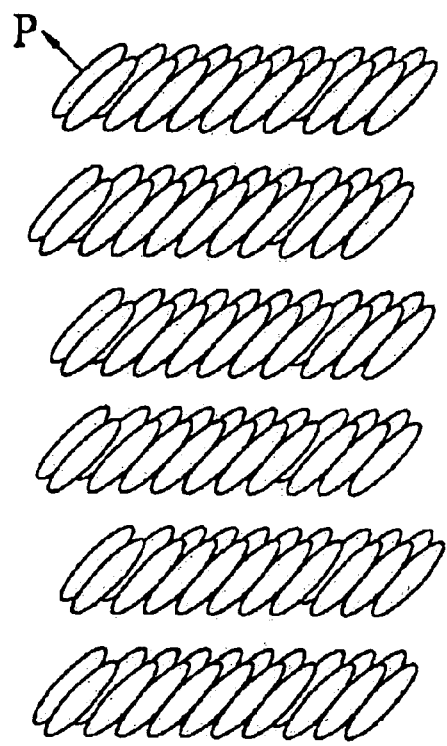
FIG. 3 is a schematic drawing showing the arrangement of unwound molecules of a ferroelectric liquid crystal.
Figure 4:
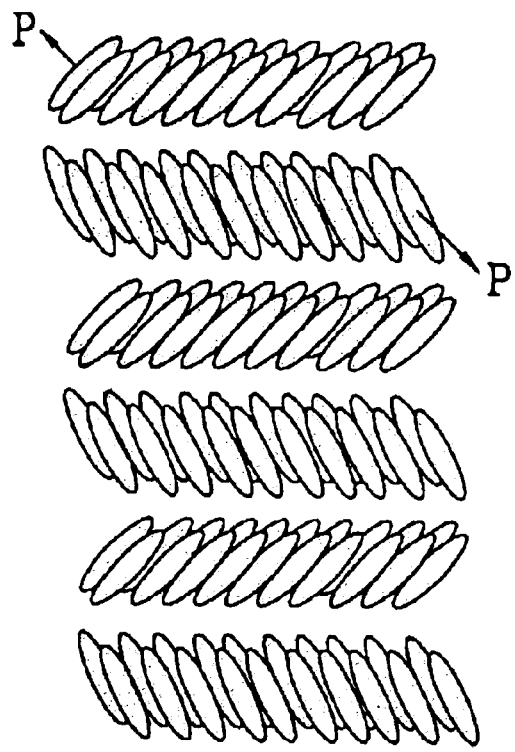
FIG. 4 is a schematic drawing showing the arrangement of unwound molecules of an antiferroelectric liquid crystal.
Figure 5:
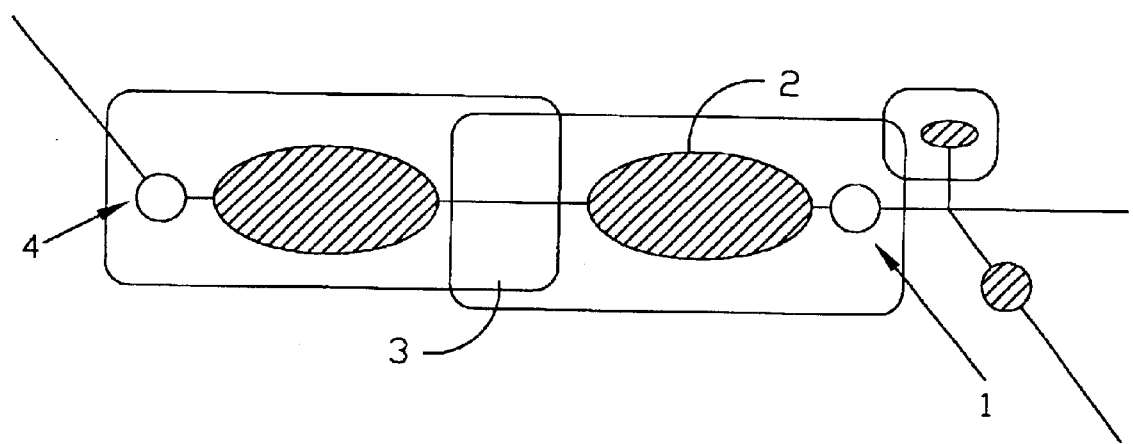
FIG. 5 is a schematic drawing showing the conjugated linkage of the molecules of an antiferroelectric liquid crystal.
Figure 6:
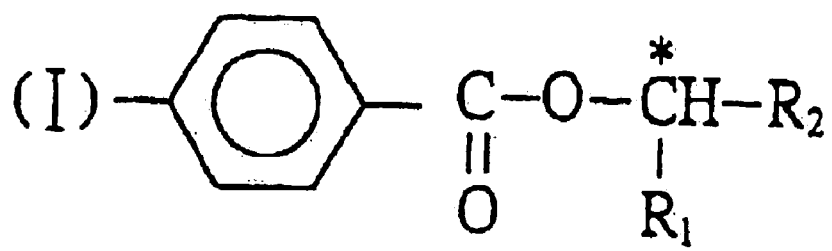
FIG. 6 is a schematic drawing showing different structures of terminal chiral alkyl chains of antiferroelectric liquid crystal molecules.
Figure 6:
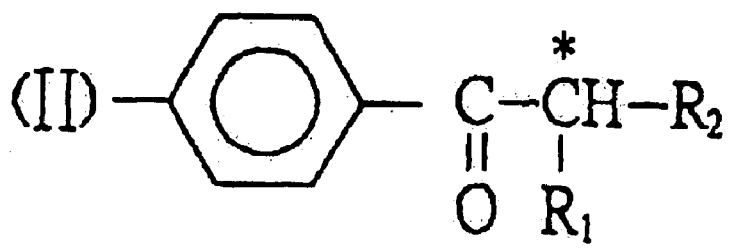
Figure 6:
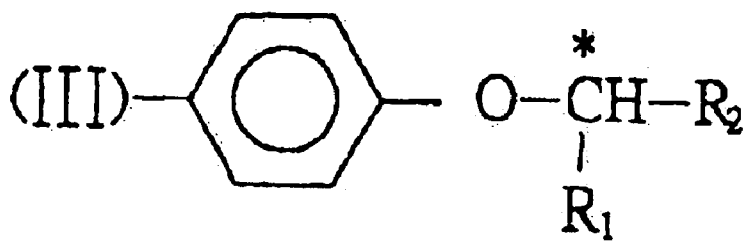
Figure 6:
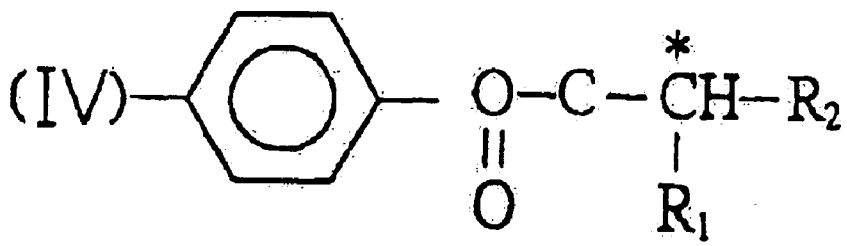
Figure 7:
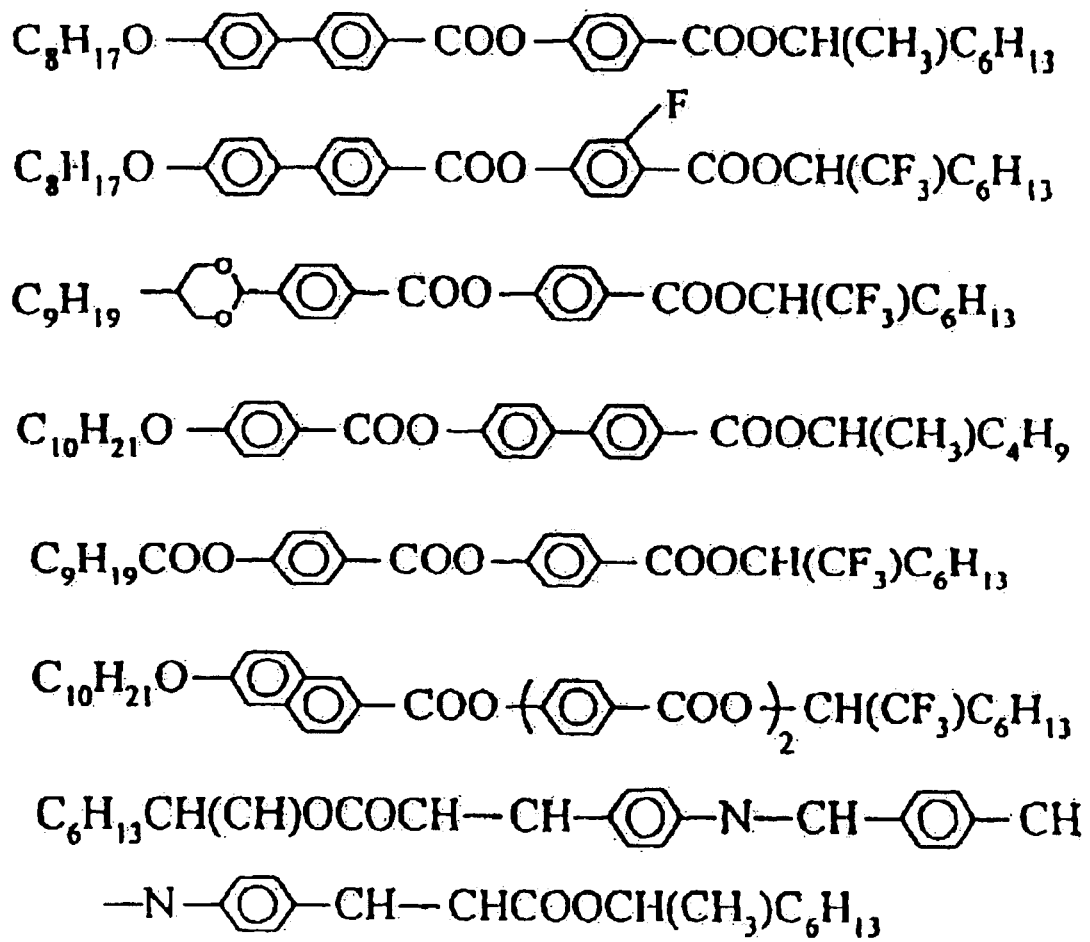
FIG. 7 is a schematic drawing showing antiferroelectric liquid crystals having different rigid core structures.
Figure 8:
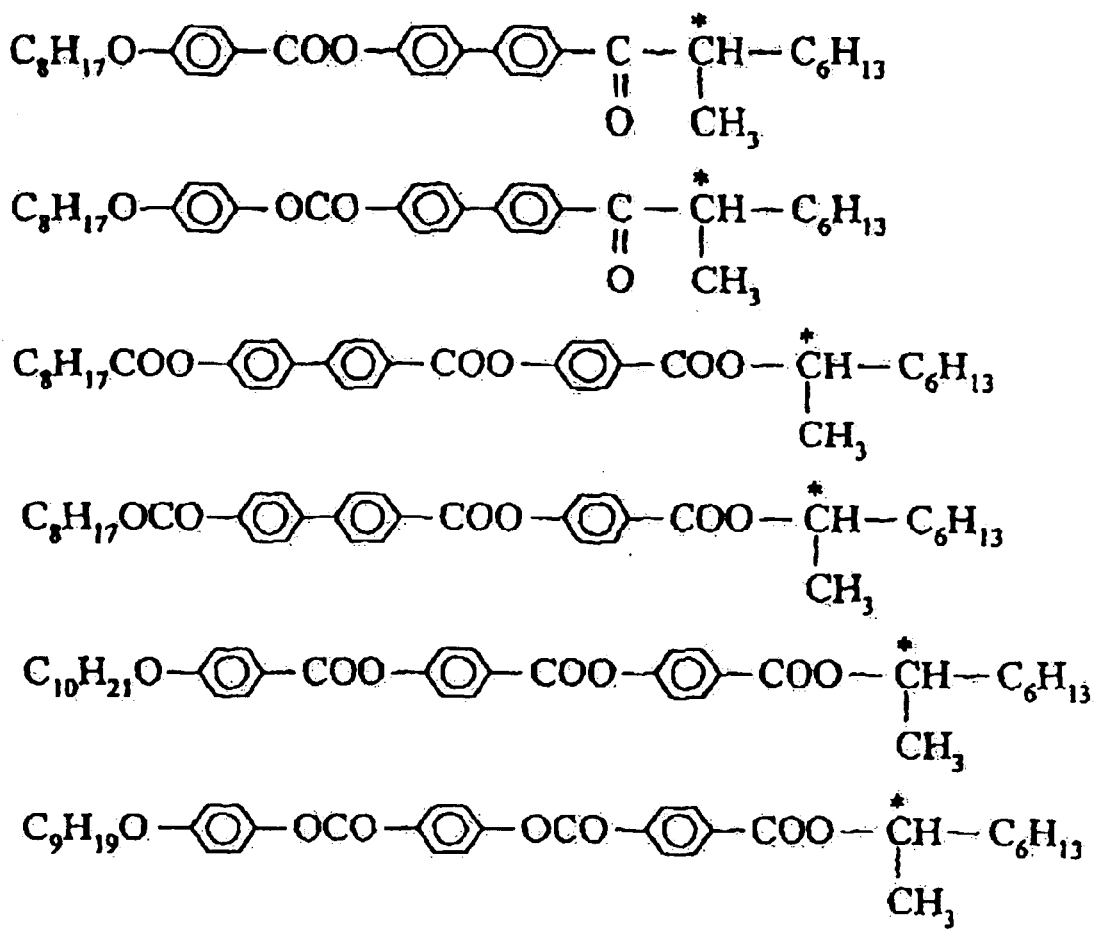
FIG. 8 is a schematic drawing showing antiferroelectric liquid crystals having different linking groups.
Figure 9:
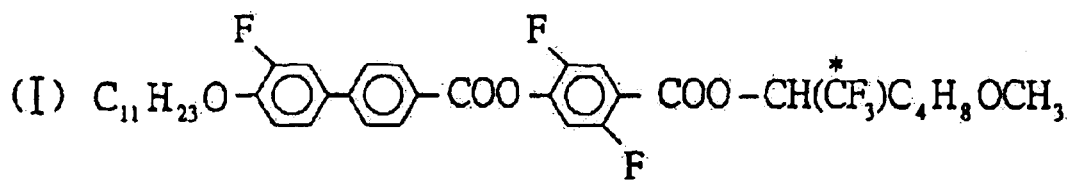
FIG. 9 is a schematic drawing showing the molecular structures of three conventional antiferroelectric materials.
Figure 9:
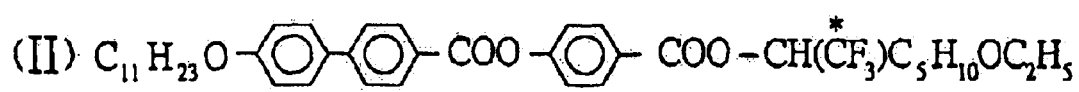
Figure 9:
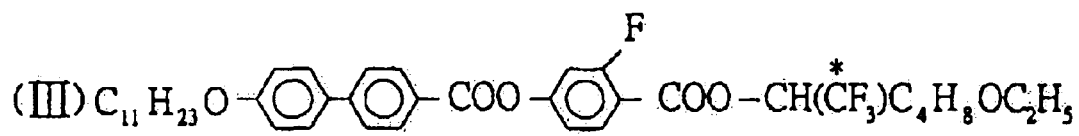

The present invention provides chiral swallow-tailed liquid crystals having thresholdless antiferroelectricity. The chiral swallow-tailed liquid crystals are synthesized from a chiral material with a molecular structure of (s)-(+)-2-(6-methoxy-2-naphthyl)propionic acid. The chiral center of the present chiral swallow-tailed liquid crystal is directly linked to its rigid core, and its chiral tail is linked with a swallow-tailed group containing an amide group. The common formula (I) of the present chiral swallow-tailed liquid crystal is shown below:

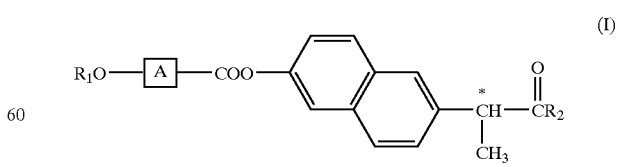

in which, $R_1$=—$C_mH_{2m+1}$, $R_2$=—$N(C_nH_{2n+1})_2$, both of m and n are integers; when m=6~16, n=3, and when m=10~15, n=2, A represents a rigid core. The rigid core has the following molecular structure:

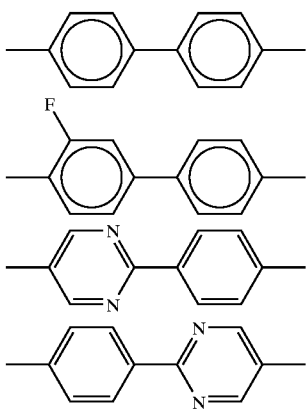

From the above formula (I), it is apparent that the chiral center and swallow-tailed group of the present compound are arranged on the same side. This structure feature enables the present chiral compound to have thresholdless antiferroelectricity property. The method for synthesizing the present chiral compound will be described in detail in accordance with following preferred embodiments with reference to the process flow shown in FIG. 10.

The chiral starting material for the synthesis of the present chiral compound is (S)-(+)-2-(6-methoxy-2-naphthyl) propionic acid, purchased from Tokyo Chemical Industry (TCI) Co. LTD., with optical purity greater than 99 per cent. Dichloromethane ($CH_2Cl_2$) is dried by treatment with $LiAlH_4$, and distilled before use.

In accordance with a first preferred embodiment of the present invention for the synthesis of the present chiral compound, at initial, a first intermediate (I) of N,N'-diethyl (S)-2-(6-methoxy-2-naphthyl)propionate is prepared. N,N'-diethyl (S)-2-(6-methoxy-2-naphthyl)propionate is synthesized by following steps.

2.85 ml, 32.5 mmol Oxaly chloride (($COCl)_2$) is added slowly to 3 g, 13 mmol (S)-2-(6-methoxy-2-naphthyl) propionic acid dissolved in 3 ml dichloromethane ($CH_2Cl_2$), and the resulting solution is heated under a first reflux temperature with stirring for 2 hours. The excess oxaly chloride is removed by evaporation under reduced pressure to obtain a crude product of (S)-2-(6-methoxy-2-naphthyl) propionic acid chloride. The crude (S)-2-(6-methoxy-2-naphthyl)propionic acid chloride is dissolved in 5 ml dichloromethane and then added to a solution of 3.36 ml, 32.5 mmol N,N'-diethylamine ($HN(CH_2CH_3)_2$) and 5 ml triethylamine (TEA) in 10 ml dichloromethane with stirring under ice bath, i.e. under a temperature about 0° C. After some solids are produced, the mixture is stayed in a refrigerator overnight, i.e. stayed in a low temperature about–5° C. for a period of time about 12 hour. The mixture is evaporated to dryness under reduced pressure and the residue is purified by column chromatography over silica gel (70~230 mesh ASTM) using dichloromethane/ethyl acetate (V:V=8:2) as the eluant. As a result, about 70 percent yield of white N,N'-diethyl (S)-2-(6-methoxy-2-naphthyl)propionate is obtained, which is the first intermediate (I) for synthesizing the chiral compound of the first preferred embodiment of the present invention.

The chemical shifts for N,N'-diethyl (S)-2-(6-methoxy-2-naphthyl)propionate in $^1$H-NMR spectrum are δ($CDCl_3$, ppm) 7.7~7.1(m, 6H, ArH), 7.25(s, $CDCl_3$), 4.0~3.9(q, 1H, ArC*H), 3.9(s, 3H, $CH_3O$), 3.6~3.0(m, 4H, $NCH_2CH_3$), 1.6(d, 3H, C*H($CH_3$)), 1.1~0.9(m, 6H, $NCH_2CH_3$).

Continuously, 5 g, 17.54 mmol N,N'-diethyl (S)-2-(6-methoxy-2-naphthyl)propionate dissolved in 68.65 ml dry dichloromethane is mixed with 3.4 ml boron tribromide ($BBr_3$) at –20° C. The mixture is stirred at –20° C. for 5 minutes, and at 0° C. for 40 minutes, After diluting with 137 ml dichloromethane, the solution was poured into a mixture of 137 ml saturated ammonium chloride and 100 g crushed ice. The organic layer is separated and washed with brine-ice, dried over anhydrous sodium sulfate ($NaSO_4$), and concentrated in vacuum. The pure N,N'-diethyl (S)-2-(6-hydroxy-2-naphthyl)propionate with about 71 percent yields is collected after recrystallization from Acetonitrile. N,N'-diethyl (S)-2-(6-hydroxy-2-naphthyl)propionate is a second intermediate (II) for synthesizing the chiral compound of the first preferred embodiment of the present invention.

The chemical shifts for N,N'-diethyl (S)-2-(6-hydroxy-2-naphthyl)propionate in $^1$H-NMR spectrum are δ($CDCl_3$, ppm) 7.8~7.0(m, 6H, ArH), 7.25(s, $CDCl_3$), 5.8~5.7(s, 1H, OH), 4.0~3.9(q, 1H, ArC*H), 3.7~3.0 (m, 4H, $NCH_2CH_3$), 1.6(d, 3H, C*H($CH_3$)), 1.2~0.9(m, 6H, $NCH_2CH_3$).

Figure 10:
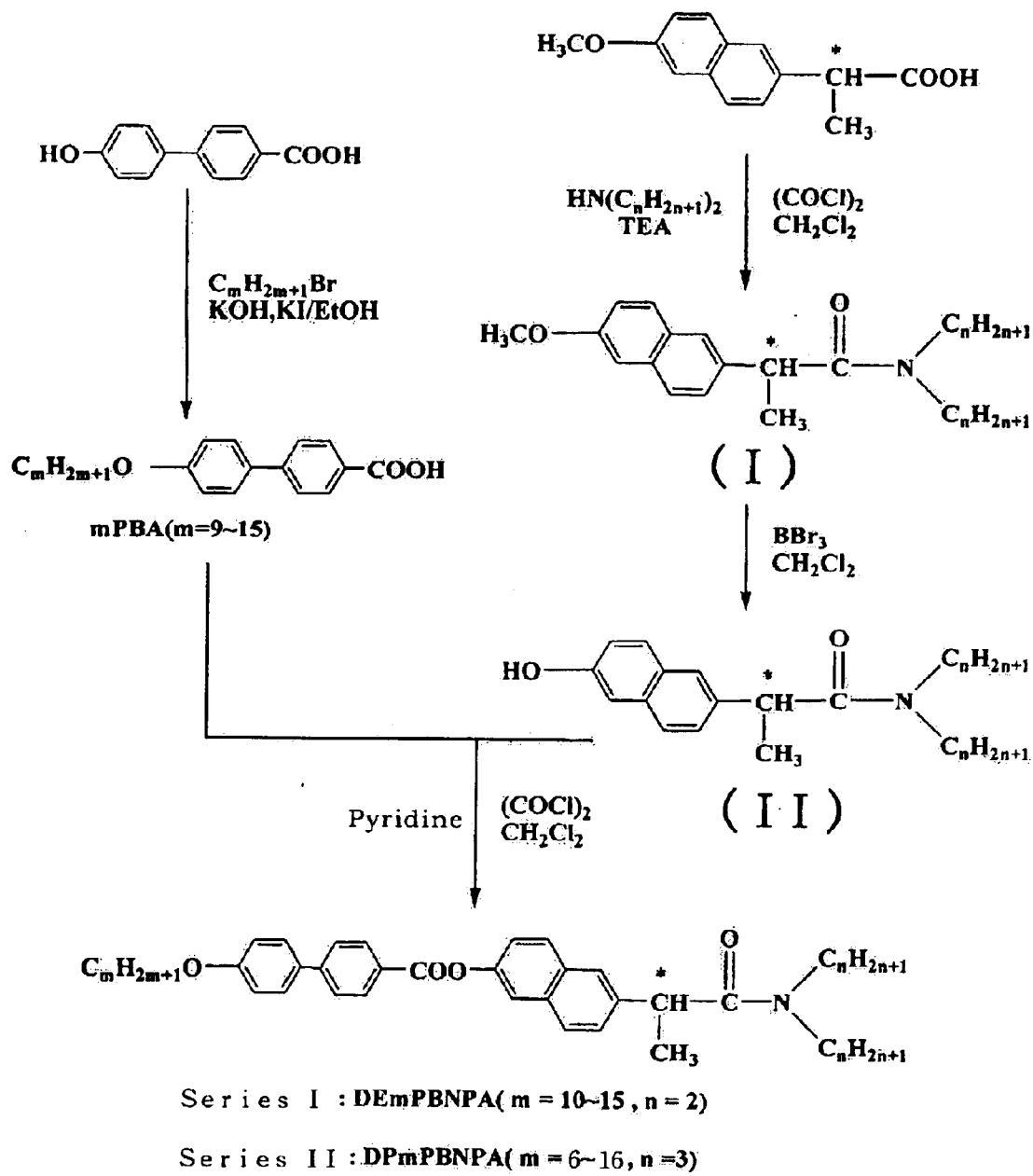
FIG. 10 is a process flow for synthesizing the chiral compound of the present invention.

Following, 0.4 ml, 4.634 mmol Oxaly chloride (($COCl$) 2) was added slowly to 0.76 g, 0.185 mmol 4-(4'-alkoxyphenyl)benzoic acids (mPBA, m=10~15, m is an integer, representing carbon number of alkoxy group $C_mH_{2m+1}O$—), and the resulting solution is heated under a second reflux temperature with stirring for 2 hours. The excess oxaly chloride was removed by evaporation under reduced pressure. The crude 4-(4'-alkoxyphenyl)benzoic acid chloride is dissolved in 5 ml dichloromethane, and then added to a mixture of 0.5 g, 0.185 mmol N,N'-diethyl (S)-2-(6-hydroxy-2-naphthyl)propionate and 5 ml pyridine in 5 ml anhydrous dichloromethane with stirring under ice bath, i.e. under a temperature about 0° C. After precipitates are produced, the mixture is stayed in refrigerator overnight, i.e. stayed in a low temperature about –5° C. for a period of time about 12 hour. The mixture is evaporated to dryness under reduced pressure and the residue is purified by column chromatography over silica gel (70~230 mesh ASTM) using dichloromethan/ethyl acetate (V:V=8:2) as the eluant. About 60 percent yield of white N,N'-diethyl (S)-2-{6-[4-(4'-alkloxyphenyl) benzoyloxy]-2-naphthyl}propionamide (DEmPBNPA, m=10~15, m is an integer, representing carbon number of alkoxy group $C_mH_{2m+1}O$—) is obtained, which are series (I) compounds of the present chiral swallow-tailed liquid crystals. The molecular structure of series (I) is shown in FIG. 10.

Besides, 4-(4'-alkoxyphenyl)benzoic acids (mPBA, m=9~15, m is an integer, representing carbon number of alkoxy group $C_mH_{2m+1}O$—) can be prepared from following steps. At first, 3.62 g, 17 mmol 4'-Hydroxybiphenyl-4-carboxylic acid and 250 ml ethanol are added into a 1000 ml three-neck round-bottom flask. One neck of the flask is equipped with a condenser, another is equipped with a dropping funnel and the other is sealed with a rubber stopper. The solution of 2.02 g, 36.07 mmol potassium hydroxide (KOH), 0.5 g, 3.01 mmol potassium iodide (KI) and 50 ml distilled water is added from dropping funnel. The mixture is refluxed for 1 hour. Afterward, 10 ml, 51 mmol alkylbromide ($C_mH_{2m+1}Br$, m=9~15, m is an integer) is added dropwise into the mixture and refluxed further for 12 hours. Subsequently, 100 ml, 10% aqueous potassium hydroxide is added and continuously refluxing continued for 2 hours. After cooling, the mixture is acidified by the addition of 5% aqueous HCl and filtered. The crude product is washed with cold water and then recrystallized from glacial acetic acid ($CH_3COOH$) and absolute ethanol ($C_2H_5OH$). 60~70 percent yields of compounds of 4-(4'-alkoxyphenyl)benzoic acids is obtained.

In accordance with a second preferred embodiment of the present invention for the synthesis of the present chiral compound, at initial, a first intermediate (I) of N,N'-dipropyl (S)-2-(6-methoxy-2-naphthyl)propionate is prepared. N,N'-dipropyl (S)-2-(6-methoxy-2-naphthyl)propionate is synthesized by following steps.

9.5 ml, 108.57 mmol Oxaly chloride is added slowly to 10 g, 43.43 mmol (S)-2-(6-methoxy-2-naphthyl)propionic acid, and the resulting solution is refluxed at a first temperature with stirring for 2 hours. The excess oxaly chloride is removed by evaporation under reduced pressure. The crude (S)-2-(6-methoxy-2-naphthyl)propionic acid chloride is dissolved in 10 ml dichloromethane, and then added to a solution of 22.33 ml, 126.85 mmol dipropylamine and 10 ml triethylamine (TEA) in 30 ml anhydrous dichloromethane with stirring under ice bath, i.e. under a temperature about 0° C. After some solids are produced, the mixture is stayed in a refrigerator overnight, i.e. stayed in a low temperature about −5° C. for a period of time for 12 hour. The mixture is evaporated to dryness under reduced pressure and the residue is purified by column chromatography over silica gel (70~230 mesh ASTM) using dichloromethan/ethyl acetate (V:V=8:2) as the eluant. About 70 percent yield of white N,N'-dipropyl (S)-2-(6-methoxy-2-naphthyl)propionate is obtained, which is a first intermediate (I) for synthesizing the chiral compound of the second preferred embodiment of the present invention.

The chemical shifts for N,N'-dipropyl (S)-2-(6-methoxy-2-naphthyl)propionate in $^1$H-NMR spectrum are $\delta$(CDCl$_3$, ppm) 7.7~7.1(m, 6H, ArH), 7.25(s, CDCl$_3$), 4.0~3.9(q, 1H, ArC*H), 3.9(s, 3H, CH$_3$O), 3.6~3.0(m, 4H, NCH$_2$CH$_2$CH$_3$), 1.5~1.4(m, 4H, NCH$_2$CH$_2$CH$_3$), 1.6(d, 3H, C*H(CH3)), 1.1~0.9(m, 6H, NCH$_2$CH$_3$).

Continuously, 8 g, 26.76 mmol N,N'-dipropyl (S)-2-(6-methoxy-2-naphthyl)propionate dissolved in 52.36 ml dry dichloromethane is mixed with 5.24 ml boron tribromide (BBr$_3$) at −20° C. The mixture is stirred at −20° C. for 5 minutes, and at 0° C. for 40 minutes. After diluting with 104.7 ml dichloromethane, the solution is poured into a mixture of 104.7 ml saturated ammonium chloride and 100 g crushed ice. The organic layer is separated and washed with brine-ice, dried over anhydrous sodium sulfate (NaSO$_4$), and concentrated in vacuum. The pure N,N'-dipropyl (S)-2-(6-hydroxy-2-naphthyl)propionate with about 51 percent yields is collected after recrystallization from Acetonitrile. N,N'-dipropyl (S)-2-(6-hydroxy-2-naphthyl)propionate is a second intermediate (II) for synthesizing the chiral compound of the second preferred embodiment of the present invention.

The chemical shifts for N,N'-dipropyl (S)-2-(6-hydroxy-2-naphthyl)propionate in $^1$H-NMR spectrum are $\delta$(CDCl$_3$;ppm) 7.8~7.0(m, 6,ArH H), 7.25(s, CDCl$_3$), 5.8~5.7(s, 1H, OH), 4.0~3.9(q, 1H, ArC*H), 3.7~3.0 (m, 4H, NCH$_2$CH$_3$), 1.6(d, 3H, C*H(CH$_3$)), 1.5~1.4(m, 4H, NCH$_2$CH$_2$CH$_3$), 1.2~0.9(m, 6H, NCH$_2$CH$_3$).

Continuously, 0.35 ml, 1.58 mmol Oxaly chloride ((COCl)$_2$) is added slowly to 0.58 g, 1.05 mmol 4-(4'-alkoxyphenyl) benzoic acids (mPBA, m=9~13, m is an integer, representing carbon number of alkoxy group C$_m$H$_{2m+1}$O—), and the resulting solution was refluxed at a second temperature with stirring for 2 hours. The excess oxaly chloride was removed by evaporation under reduced pressure. The crude 4-(4'-alkoxyphenyl) benzoic acid chloride is dissolved in 3 ml dichloromethane and then added to a mixture of 0.3 g, 1.05 mmol N,N'-dipropyl (S)-2-(6-hydroxy-2-naphthyl) propionate and 5 ml pyridine in 5 ml dichloromethane with stirring under ice bath, i.e. under a temperature about 0° C. After precipitates are produced, the mixture is stayed in a refrigerator overnight, i.e. stayed in a low temperature about −5° C. The cold solution is evaporated to dryness under reduced pressure and the residue is purified by column chromatography over silica gel (70~230 mesh ASTM) using dichloromethan/Ethyl acetate(8:2) as the eluant. About 60 percent yield of white N,N'-dipropyl (S)-2-{6-[4-(4'-alkloxyphenyl)benzoyloxy]-2-naphthyl}propionamide (DPmPBNPA, m=9~13) is obtained, which are series (II) compounds of the present chiral swallow-tailed liquid crystals. The molecular structure of series (II) is shown in FIG. 10.

The molecular structures of the first intermediate (I) and second intermediate (II) synthesized from the methods of the first preferred embodiment and second preferred embodiment are shown as follows:

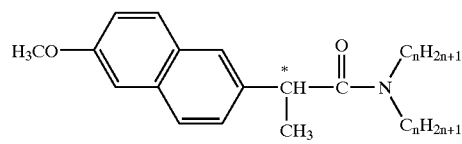

First Intermediate (I)

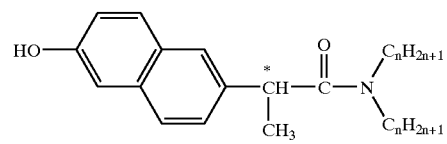

Second Intermediate (II)

In the first preferred embodiment, n=2 for the first intermediate (I) and the second intermediate (II). In the second preferred embodiment, n=3 for the first intermediate (I) and the second intermediate (II). It is apparent that the chiral center and swallow-tailed group are arranged on the same side. This structural feature enables the present compounds to have thresholdless antiferroelectricity property.

The chiral swallow-tailed liquid crystals of the present invention provide optical-electrical properties such as antiferroelectricity and thresholdless V-shaped switching, which advantageously optimize the mixing ratio of the liquid crystals for the manufacture of V-shaped thin film transistor liquid crystal displays.

The preferred embodiments are only used to illustrate the present invention, not intended to limit the scope thereof. Many modifications of the preferred embodiments can be made without departing from the spirit of the present invention.

What is claimed is:

1. A chiral swallow-tailed liquid crystal, having a chiral center directly linked to a rigid core thereof and a swallow-tailed group linked to the chiral tail thereof, said chiral swallow-tailed liquid crystal having a common formula:

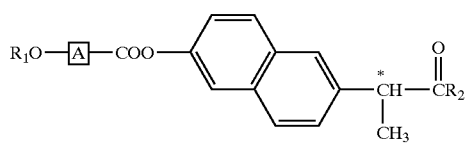

in which $R_1$=—C$_m$H$_{2m+1}$, $R_2$=—N(C$_n$H$_{2n+1}$)$_2$, m=10–15 and n=2, both of m and n are integer, and A representing a rigid core having a formula:

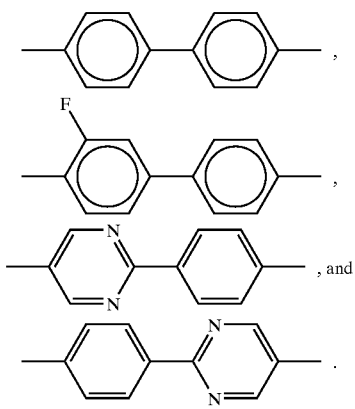

2. A chiral swallow-tailed liquid crystal, having a chiral center directly linked to a rigid core thereof and a swallow-tailed group linked to the chiral tail thereof, said chiral swallow-tailed liquid crystal having a common formula:

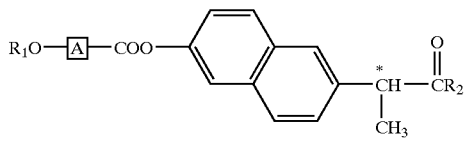

in which $R_1=-C_mH_{2m+1}$, $R_2=-N(C_nH_{2n+1})_2$, $m=6-16$ and $n=3$, both of m and n are integer, and A representing a rigid core having a formula:

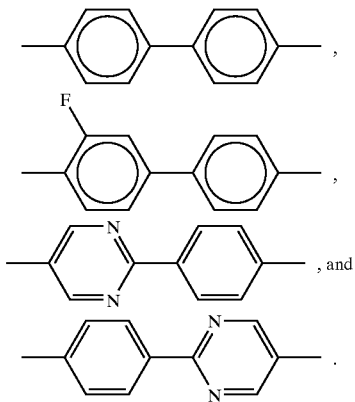

3. A method for fabricating a chiral swallow-tailed liquid crystal, comprising steps of:
(1) reacting oxaly chloride ((COCl)$_2$) with (S)-2-(6-methoxy-2-naphthyl)propionic acid to obtain a crude product of (S)-2-(6-methoxy-2-naphthyl)propionic acid chloride, and reacting the crude (S)-2-(6-methoxy-2-naphthyl)propionic acid chloride with a solution of N,N'-diethylamine (HN(CH$_2$CH$_3$)$_2$) and triethylamine (TEA) to obtain a first intermediate (I) N,N'-diethyl (S)-2-(6-methoxy-2-naphthyl)propionate;
(2) reacting said first intermediate (I) N,N'-diethyl (S)-2-(6-methoxy-2-naphthyl)propionate prepared from said step (1) with boron tribromide (BBr$_3$) to obtain a second intermediate (II) N,N'-diethyl (S)-2-(6-hydroxy-2-naphthyl)propionate; and
(3) reacting oxaly chloride ((COCl)$_2$) with 4-(4'-alkoxyphenyl)benzoic acids (mPBA, m=10–15, m is an integer, representing carbon number of alkoxy group C$_m$H$_{2m+1}$O—), to obtain a crude 4-(4'-alkoxyphenyl)benzoic acid chloride, and reacting the crude 4-(4'-alkoxyphenyl)benzoic acid chloride with said second intermediate (II) N,N'-diethyl (S)-2-(6-hydroxy-2-naphthyl)propionate prepared from said step (2) to obtain N,N'-diethyl (S)-2-{6-[4-(4'-alkoxyphenyl)benzoyloxy]-2-naphthyl}propionamide (m=10–15, m is an integer, representing carbon number of alkoxy group C$_m$H$_{2m+1}$O—).

4. The method of claim 3, wherein 4-(4'-alkoxyphenyl)benzoic acids of step (3) is prepared from steps of: reacting 4'-hydroxybiphenyl-4-carboxylic acid with alkylbromide (C$_m$H$_{2m+1}$Br, m=9–15, m is an integer) to obtain 4-(4'-alkoxyphenyl)benzoic acids.

5. A method for fabricating a chiral swallow-tailed liquid crystal, comprising steps of:
(1) reacting oxaly chloride with (S)-2-(6-methoxy-2-naphthyl)propionic acid to obtain a crude (S)-2-(6-methoxy-2-naphthyl)propionic acid chloride, and reacting the crude (S)-2-(6-methoxy-2-naphthyl)propionic acid chloride with a solution of dipropylamine and triethylamine (TEA) to obtain a first intermediate (I) N,N'-dipropyl (S)-2-(6-methoxy-2-naphthyl)propionate;
(2) reacting said first intermediate (I) N,N'-dipropyl (S)-2-(6-methoxy-2-naphthyl)propionate prepared from said step (1) with boron tribromide (BBr$_3$) to obtain a second intermediate (II) N,N'-dipropyl (S)-2-(6-hydroxy-2-naphthyl)propionate; and
(3) reacting oxaly chloride ((COCl)$_2$) with 4-(4'-alkoxyphenyl) benzoic acids (mPBA, m=9–13, m is an integer, representing carbon number of alkoxy group C$_m$H$_{2m+1}$O—), to obtain a crude 4-(4'-alkoxyphenyl) benzoic acid chloride, and reacting the crude 4-(4'-alkoxyphenyl) benzoic acid chloride with a mixture of said second intermediate (II) N,N'-dipropyl (S)-2-(6-hydroxy-2-naphthyl) propionate prepared from said step (2) to obtain N,N'-dipropyl (S)-2-{6-[4-(4'-alkloxyphenyl)benzoyloxy]-2-naphthyl}propionamide (DPmPBNPA, m=9–13).

6. The method of claim 5, wherein 4-(4'-alkoxyphenyl) benzoic acids of step (3) is prepared from steps of: reacting 4'-hydroxybiphenyl-4-carboxylic acid with alkylbromide (C$_m$H$_{2m+1}$Br, m=9–15, m is an integer) to obtain 4-(4'-alkoxyphenyl)benzoic acids.

7. A method for fabricating a chiral swallow-tailed liquid crystal, comprising steps of:
(1) adding 2.85 ml, 32.5 mmol oxaly chloride ((COCl)$_2$) to 3 g, 13 mmol (S)-2-(6-methoxy-2-naphthyl) propionic acid dissolved in 3 ml dichloromethane (CH$_2$Cl$_2$), heating the resulting solution under a first reflux temperature with stirring for 2 hours to obtain a crude product of (S)-2-(6-methoxy-2-naphthyl) propionic acid chloride, dissolving the crude (S)-2-(6-methoxy-2-naphthyl)propionic acid chloride in 5 ml dichloromethane and then adding to a solution of 3.36 ml, 32.5 mmol N,N'-diethylamine (HN(CH$_2$CH$_3$)$_2$) and 5 ml triethylamine (TEA) in 10 ml dichloromethane with stirring under a temperature about 0° C., keeping the mixture at a low temperature about –5° C. for a period of time about 12 hour, and then drying and purifying the mixture to obtain a first intermediate (I) N,N'-diethyl (S )-2-(6-methoxy-2-naphthyl )propionate;
(2) dissolving 5 g, 17.54 mmol said first intermediate (I) N,N'-diethyl (S)-2-(6-methoxy-2-naphthyl)propionate prepared from said step (1) in 68.65 ml dichloromethane, and then mixing with 3.4 ml boron tribromide (BBr$_3$) at −20° C., stirring the mixture at −20° C. for 5 minutes and at 0° C. for 40 minutes, then diluting with 137 ml dichloromethane, pouring the solution into a mixture of 137 ml saturated ammonium chloride and 100 g crushed ice, then separating the organic layer therefrom, washing with brine-ice, and drying and concentrating the organic layer, and proceeding recrystallization to obtain a second intermediate (II) N,N'-diethyl (S)-2-(6-hydroxy-2-naphthyl) propionate; and (3) adding 0.4 ml, 4.634 mmol oxaly chloride ((COCl)$_2$) to 0.76 g, 0.185 mmol 4-(4'-alkoxyphenyl)benzoic acids (mPBA, m=10–15, m is an integer, representing carbon number of alkoxy group $C_mH_{2m+1}O$—), and heating the resulting solution under a second reflux temperature with stirring for 2 hours to obtain a crude 4-(4'-alkoxyphenyl)benzoic acid chloride, dissolving the crude 4-(4'-alkoxyphenyl)benzoic acid chloride in 5 ml dichloromethane, and then adding to a mixture of 0.5 g, 0.185 mmol said second intermediate (II) N,N'-diethyl (S)-2-(6-hydroxy-2-naphthyl)propionate prepared from said step (2) and 5 ml pyridine in 5 ml dichloromethane with stirring under a temperature about 0° C., keeping the mixture at a low temperature about −5° C. for a period of time about 12 hour, and then drying and purifying the mixture to obtain N,N'-diethyl (S)-2-{6-[4-(4'-alkloxyphenyl)benzoyloxy]-2-naphthyl}propionamide (m=10–15, m is an integer, representing carbon number of alkoxy group $C_mH_{2m+1}O$—).

8. The method of claim 7, wherein the organic layer of said step (2) is dried over anhydrous sodium sulfate (Na$_2$SO$_4$).

9. The method of claim 7, wherein the recrystallization of said step (2) is proceeded with acetonitrile to obtain said second intermediate (II).

10. The method of claim 7, wherein 4-(4'-alkoxyphenyl) benzoic acids of step (3) is prepared from steps of: adding 3.62 g, 17 mmol 4'-hydroxybiphenyl-4-carboxylic acid and 250 ml ethanol into a solution of 2.02 g, 36.07 mmol potassium hydroxide (KOH), 0.5 g, 3.01 mmol potassium iodide (KI) and 50 ml distilled water, then refluxing the mixture for 1 hour, adding 10 ml, 51 mmol alkylbromide ($C_mH_{2m+1}Br$, m=9–15, m is an integer) into the mixture, refluxing for 12 hours, then adding 100 ml, 10% aqueous potassium hydroxide into the mixture and refluxing for 2 hours, after cooling, acidifying the mixture by the addition of 5% aqueous HCl and filtering the mixture to obtain a crude product, washing the crude product with cold water, and then recrystallizing the crude product to obtain 4-(4'-alkoxyphenyl)benzoic acids.

11. The method of claim 10, wherein 4-(4'-alkoxyphenyl) benzoic acid is recrystallized from glacial acetic acid (CH$_3$COOH) and absolute ethanol (C$_2$H$_5$OH).

12. The method of claim 7, wherein said first intermediate (I) prepared from said step (1) is purified by column chromatography over silica gel (70–230 mesh) using dichloromethane/ethyl acetate (V:V=8:2) as an eluant.

13. The method of claim 7, wherein said second intermediate (II) prepared from said step (2) is purified by column chromatography over silica gel (70–230 mesh) using dichloromethane/ethyl acetate (V:V=8:2) as an eluant.

14. A method for fabricating a chiral swallow-tailed liquid crystal, comprising steps of:

(1) adding 9.5 ml, 108.57 mmol oxaly chloride to 10 g, 43.43 mmol (S)-2-(6-methoxy-2-naphthyl)propionic acid, and refluxing the resulting solution at a first temperature with stirring for 2 hours to obtain a crude (S)-2-(6-methoxy-2-naphthyl)propionic acid chloride, dissolving the crude (S)-2-(6-methoxy-2-naphthyl) propionic acid chloride in 10 ml dichloromethane, and then adding to a solution of 22.33 ml, 126.85 mmol dipropylamine and 10 ml triethylamine (TEA) in 30 ml anhydrous dichloromethane with stirring under a temperature about 0° C., then keeping the mixture at a low temperature about −5° C. for a period of time for 12 hour, drying and purifying the mixture to obtain a first intermediate (I) N,N'-dipropyl (S)-2-(6-methoxy-2-naphthyl)propionate;

(2) dissolving 8 g, 26.76 mmol said first intermediate (I) N,N'-dipropyl (S)-2-(6-methoxy-2-naphthyl) propionate prepared from said step (1) in 52.36 ml dichloromethane, then mixing with 5.24 ml boron tribromide (BBr$_3$) at −20° C., stirring the mixture at −20° C. for 5 minutes and at 0° C. for 40 minutes, then diluting with 104.7 ml dichloromethane, and pouring the solution into a mixture of 104.7 ml saturated ammonium chloride and 100 g crushed ice, separating the organic layer therefrom, washing with brine-ice, drying and concentrating the organic layer, and proceeding recrystallization to obtain a second intermediate (II) N,N'-dipropyl (S)-2-(6-hydroxy-2-naphthyl) propionate; and (3) adding 0.35 ml, 1.58 mmol oxaly chloride ((COCl)$_2$) to 0.58 g, 1.05 mmol 4-(4'-alkoxyphenyl) benzoic acids (mPBA, m=9–13, m is an integer, representing carbon number of alkoxy group $C_mH_{2m+1}O$—), and refluxing the resulting solution at a second temperature with stirring for 2 hours to obtain a crude 4-(4'-alkoxyphenyl) benzoic acid chloride, dissolving the crude 4-(4'-alkoxyphenyl) benzoic acid chloride in 3 ml dichloromethane and then adding to a mixture of 0.3 g, 1.05 mmol said second intermediate (II) N,N'-dipropyl (S)-2-(6-hydroxy-2-naphthyl) propionate prepared from said step (2) and 5 ml pyridine in 5 ml dichloromethane with stirring under a temperature about 0° C., keeping the mixture at a low temperature about −5° C., drying and purifying the mixture to obtain N,N'-dipropyl (S)-2-{6-[4-(4'-alkloxyphenyl)benzoyloxy]-2-naphthyl}propionamide (DPmPBNPA, m=9–13).

15. The method of claim 14, wherein the recrystallization of said step (2) is proceeded with acetonitrile to obtain said second intermediate (II).

16. The method of claim 14, wherein 4-(4'-alkoxyphenyl) benzoic acids of step (3) is prepared from steps of: adding 3.62 g, 17 mmol 4'-hydroxybiphenyl-4-carboxylic acid and 250 ml ethanol into a solution of 2.02 g, 36.07 mmol potassium hydroxide (KOH), 0.5 g, 3.01 mmol potassium iodide (KI) and 50 ml distilled water, then refluxing the mixture for 1 hour, adding 10 ml, 51 mmol alkylbromide ($C_mH_{2m+1}Br$, m=9–15, m is an integer) into the mixture, refluxing for 12 hours, then adding 100 ml, 10% aqueous potassium hydroxide into the mixture and refluxing for 2 hours, after cooling, acidifying the mixture by the addition of 5% aqueous HCl and filtering the mixture to obtain a crude product, washing the crude product with cold water, and then recrystallizing the crude product to obtain 4-(4'-alkoxyphenyl)benzoic acids.

17. The method of claim 16, wherein 4-(4'-alkoxyphenyl) benzoic acid is recrystallized from glacial acetic acid (CH$_3$COOH) and absolute ethanol (C$_2$H$_5$OH).

18. The method of claim 14, wherein said first intermediate (I) prepared from said step (1) is purified by column chromatography over silica gel (70–230 mesh) using dichloromethane/ethyl acetate (V:V=8:2) as an eluant.

19. The method of claim 14, wherein said second intermediate (II) prepared from said step (2) is purified by column chromtography over silica gel (70–230 mesh) using dichloromethane/ethyl acetate (V:V=8:2)as an eluant.

* * * * *